United States Patent [19]

Coué

[11] Patent Number: 4,535,644
[45] Date of Patent: Aug. 20, 1985

[54] LEVER UNIT IN PARTICULAR FOR A CYCLE

[75] Inventor: Maurice E. L. Coué, Feucherolles, France

[73] Assignee: Huret et ses Fils, Nanterre, France

[21] Appl. No.: 566,490

[22] Filed: Dec. 29, 1983

Related U.S. Application Data

[62] Division of Ser. No. 452,710, Dec. 23, 1982.

[30] Foreign Application Priority Data

Dec. 30, 1981 [FR] France .................... 81 24503

[51] Int. Cl.³ .................... F16C 1/10; G05G 11/00
[52] U.S. Cl. .................... 74/489; 74/501 R
[58] Field of Search .................... 74/501 R, 489, 488, 74/523, 548; 24/270, 31 F; 403/353

[56] References Cited

U.S. PATENT DOCUMENTS

| | | | |
|---|---|---|---|
| 3,924,487 | 12/1975 | Huret et al. | 74/501 R |
| 4,156,371 | 5/1979 | Juy | 74/501 R |
| 4,222,286 | 9/1980 | Huret | 74/501 R |

Primary Examiner—Kenneth J. Dorner
Attorney, Agent, or Firm—Trexler, Bushnell & Wolters, Ltd.

[57] ABSTRACT

The invention simplifies the manufacture of levers employed in particular for actuating cycle derailleurs and facilitates the mounting of the cable on these levers. For this purpose, the lever 20 has at least one cavity 31 in which the cable can be engaged resiliently in opposition to the action of a retaining device.

8 Claims, 5 Drawing Figures

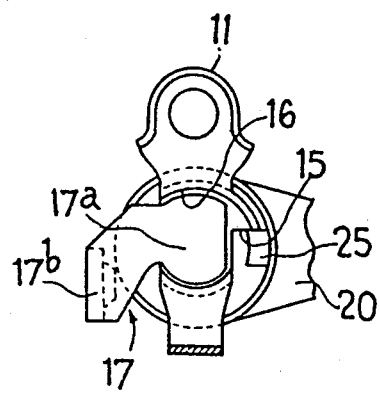
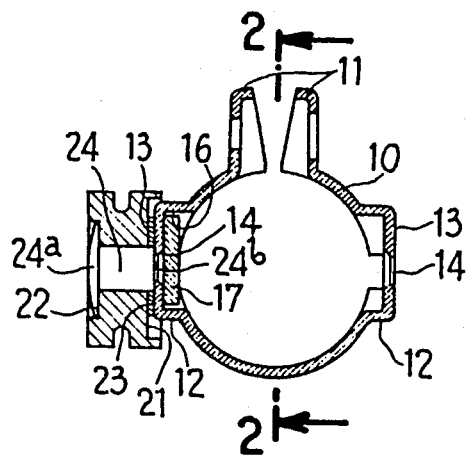
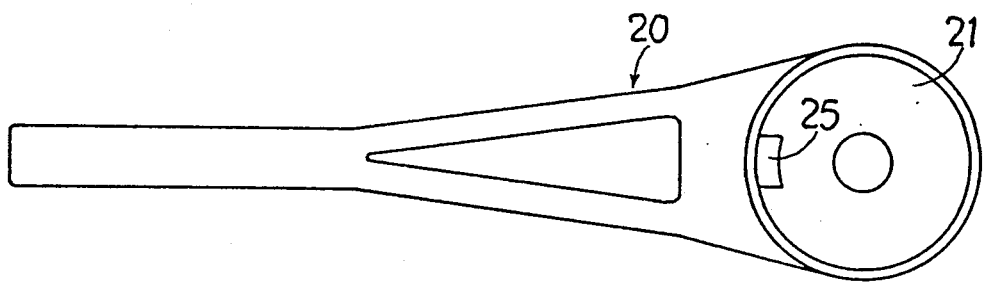
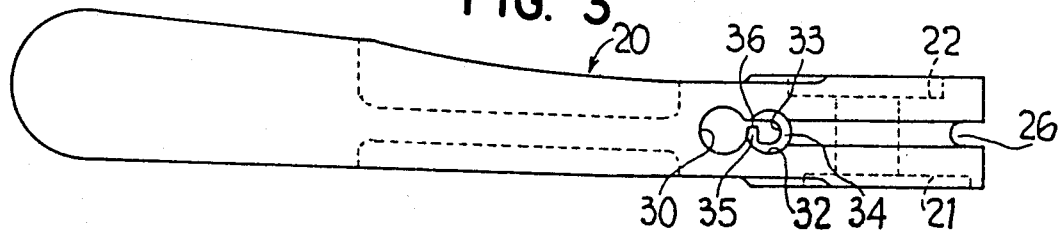
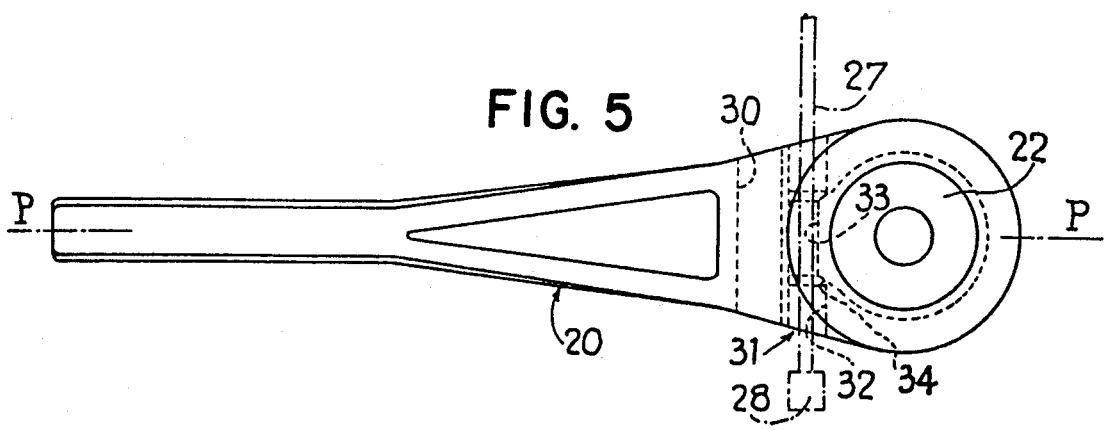

LEVER UNIT IN PARTICULAR FOR A CYCLE

This application is a division of application Ser. No. 452,710, filed 12/23/82.

DESCRIPTION

The present invention relates to levers for actuating derailleurs or the like employed in particular on cycles.

These levers comprise, in the prior art, a cavity of stepped section defining a shoulder against which abuts the metal of larger section than the cable and which constitutes the head of the cable. As a result of this arrangement, when securing the cable to the lever, the cable must first be passed through the cavity by its end opposed to that carrying the head and this assembly is usually effected in the factory in the course of the assembly of the lever and its support collar. Further, the replacement of the cable is also a relatively complicated operation.

An object of the invention is to provide a lever on which the actuating cable can be easily mounted, namely by the user, after the lever itself has been mounted on its support collar wherein the collar comprises, in one piece with the collar, at least one radially projecting portion which defines on the outer surface thereof a bearing surface for the lever and on the inner surface thereof a cavity capable of receiving a member constituting a sheath abutment.

The invention therefore provides a lever unit, in particular for a cycle, defining a throughway cavity for an actuating cable, wherein said cavity comprises a cavity part in which the actuating cable can be elastically clipped and retained and which defines an abutment for a head of the cable.

The lever defines a first cylindrical cavity part extending throughout the lever and in which cavity part the head of the cable is capable of freely passing, and a second cavity part extending in a direction parallel to the first cavity part and communicating with the first cavity part laterally through a lateral passage whose width is less than the diameter of the cable, said second cavity part being stepped and comprising a portion having a diameter exceeding the diameter of the head of the cable and a portion having a diameter intermediate between the diameter of the cable and the diameter of the head of the cable.

The invention will be described in more detail hereinafter with reference to the accompanying drawing which is given solely by way of example and in which:

FIG. 1 is a sectional view of a collar and lever unit according to the invention;

FIG. 2 is a sectional view taken on line 2—2 of FIG. 1;

FIG. 3 is an elevational view to an enlarged scale of the lever;

FIGS. 4 and 5 are two side elevational views of the same lever.

The drawing, and in particular FIGS. 1 and 2, shows a lever unit, for example a lever for actuating a derailleur for a cycle, comprising a collar 10 on which is mounted the lever proper 20. The collar is shaped in such manner as to define, on one hand, fixing tabs 11 which may be, for example, associated with conventional screw-and-nut means and, on the other hand, two projecting portions 12 which are disposed at roughly 90° relative to the fixing tabs and diametrically opposed to each other. Each of these two projecting portions extends roughly radially relative to the collar and defines a bearing surface 13 which is roughly planar and is radially outwardly offset from the periphery of the collar and perpendicular to the diameter of the collar. This bearing surface is provided with an orifice 14 centered on the same diameter of the collar.

As can be seen in FIG. 2, the projecting portion includes a step 15 which constitutes an abutment limiting the angular travel of the lever. This projecting portion further defines, on the inner surface thereof facing the axis of the collar, a cavity 16 in which may be received an L-shaped member 17 having one branch 17a shaped in such manner as to be capable of being received in the cavity 16 and another branch 17b shaped so as to act as a sheath abutment and allow the actuating cable to pass therethrough.

Also according to the invention, the lever 20 is mounted in a very simple manner. This lever, which is for example made from a plastics or other material, comprises on each of its sides a counterbore 21, 22 at the end of a bore, the counterbore 21 facing the collar preferably receiving a washer 23 of elastically yieldable material, for example of polyurethane, interposed between the end of the counterbore and the bearing surface of the collar. This washer has for example a thickness of 4 mm in the free state and is compressed to a thickness of about 2 mm upon assembly. The means for mounting the lever on the coller 10 comprise a rivet 24 having a body portion 24b extending into the bore in the lever and a head 24a which outwardly offset relative to the collar and is received in the counterbore 22 of the lever the body portion 24b being riveted behind the rear side of the projecting portion 12. The latter is so shaped that the end of the rivent does not project into the cavity 16 and does not hinder the insertion of the member 17 having the branch 17b constituting the sheath abutment.

The lever proper will now be described in more detail with reference to FIGS. 3 to 5. This lever comprises, on the side thereof facing the collar, a lug 25 adapted to cooperate with the abutment 15 of the collar so as to limit its angular travel. It includes a groove 26 for the passage of the cable and a cavity of original shape allowing the mounting of the head of the cable 27 which is constituted in the conventional manner by a small metal member 28 of substantially cylindrical shape fixed on the end of the cable and having a cross-sectional size larger than the cross-sectional size of the cable 27. A cavity formed in the lever includes a first roughly cylindrical cavity part 30 whose axis is orthogonal to the axis of the bare receiving the rivet 24 and whose diameter is slightly greater than the diameter of the head 28 of the cable. This first cylindrical cavity part extends throughout the width of the lever as shown in FIG. 5 and opens roughly tangentially onto a second stepped cavity 31 as shown in FIG. 3 through a lateral passage 36. The cavity part 31 includes, on one hand, a cylindrical cavity part 32 whose diameter is slightly greater than the diameter of the head 28 of the cable, and a coaxial passage 33 whose diameter is greater than the diameter of the cable, but less than that of said head. A transverse shoulder 34 is therefore provided at the junction of the cavity part 32 and the passage 33. Further, a partition portion 35 between the two cavities 30 and 31 includes the aforementioned lateral passage 36 which extends also throughout the width of the lever and has in at least a part of its length a cross-sectional width less than the diameter of the cable The cavity part 30 communicates laterally through the lateral passage 36 with the cavity part 31.

Preferably, this part of the lever is constructed rougly symmetrical with respect to a plane such as the plane P shown in FIG. 5, so that two identical cavities 32 are provided for the cable which may therefore be mounted on one side or the other of the lever.

The above described construction of the lever is very advantageous, since it is unecessary to mount the cable in the factory when manufacturing the lever and this cable can therefore be mounted by the user very simply by engaging its end in the cylindrical cavity part 30 in either direction and then exerting a sufficient force in the direction of the second cavity part 31 to cause the cable to pass through the lateral passage 36 in the partition wall 35, after which the cable is maintained in position and can no longer leave the cavity part 31.

Having now described my invention what I claim as new and desire to secure by Letters Patent is:

1. A lever unit for combination with a cable and cable head which head is fixed to an end of the cable and has a larger cross-sectional size than that of said cable, said lever comprising means mounting the lever on a collar so as to be rotatable about an axis, and a throughway cavity in the lever, said cavity having a part of a large cross-sectional size large enough to receive said cable head and a part of a small cross-sectional size large enough to freely receive said cable but too small to allow passage of said head therethrough, whereby said two cavity parts define a shoulder against which shoulder said head abuts when said cable is placed in said cavity part of small cross-sectional size, a partition portion of said lever defining a lateral passage providing a lateral entrance to said cavity to allow said cable to be inserted in said cavity by shifting said cable transversely of said cable and transversely of said cavity, said lateral passage being slightly smaller in cross-sectional size than the cross-sectional size of said cable, said partition portion being sufficiently resilient to allow passage of said cable through said passage upon application of lateral force on said cable whereby said cable is retained laterally in said cavity after passage through said passage.

2. A lever unit according to claim 1, wherein the cavity is substantially symmetrical relative to a plane of the lever containing said axis of rotation of the lever whereby the cable may be mounted on one side or the other of said plane.

3. A lever unit for combination with a cable and a cable head, which head is fixed to an end of the cable and has a larger cross-sectional size than the cross-sectional size of said cable, the lever defining a cavity comprising a first cylindrical cavity part extending throughout the lever and in which cavity part the head of the cable is capable of freely passing, and a second cavity part extending in a direction substantially parallel to the first cavity part, the lever defining a resiliently yieldable partition portion between said first cavity part and said second cavity part and defining a lateral passage putting the first cavity part laterally in communication with the second cavity part, said passage having a width less than the diameter of the cable, said second cavity part being stepped and comprising a portion having a cross-sectional size exceeding the cross-sectional size of the head of the cable and a portion having a cross-sectional size intermediate between the cross-sectional size of the cable and the cross-sectional size of the head of the cable, said lateral passage allowing lateral passage of the cable by application of a lateral force on said cable and a yielding of said partition portion and subsequently retaining said cable in said second cavity part, and means mounting the lever on a collar to rotate about an axis.

4. A lever unit according to claim 3, wherein each cavity part is substantially symmetrical relative to a plane of the lever containing said axis of rotation of the lever, whereby the cable may be mounted on one side or the other of said plane.

5. A lever, in particular for a cycle, defining a cavity for an actuating cable and abutment means for a head fixed to said cable, the lever comprising resiliently yieldable retaining means defining a lateral entrance passage for said cavity, which passage is smaller than the diameter of said cable, the cable being engageable in said cavity transversely of the cable and cavity by a yielding of said retaining means after which said retaining means retains the cable in the cavity.

6. A lever according to claim 5, wherein the cavity defines a first cylindrical cavity part extending throughout the lever and through which cavity part the head of the cable is capable of freely passing, and a second cavity part extending in a direction substantially parallel to the first cavity part, the lever defining a resiliently yieldable partition portion between said first cavity part and said second cavity part and defining a lateral passage putting the first cavity part laterally in communication with the second cavity part, said passage having a width less than the diameter of the cable, said second cavity part being stepped and comprising a portion having a cross-sectional size exceeding the cross-sectional size of the head of the cable and a portion having a cross-sectional size intermediate between the cross-sectional size of the cable and the cross-sectional size of the head of the cable, said lateral passage allowing lateral passage of the cable by application of a lateral force on said cable and a yielding of said partition portion and subsequently retaining said cable in said second cavity part.

7. A lever according to claim 6, wherein each cavity part is substantially symmetrical relative to a plane of the lever containing an axis of rotation of the lever defined by means for rotatively mounting the lever whereby the cable may be mounted on one side or the other of said plane.

8. A lever according to claim 5, wherein the cavity is substantially symmetrical relative to a plane of the lever containing an axis of rotation of the lever defined by means for rotatively mounting the lever whereby the cable may be mounted on one side or the other of said plane.

* * * * *